United States Patent [19]

Moreland

[11] Patent Number: 4,886,575

[45] Date of Patent: * Dec. 12, 1989

[54] DETACKIFICATION OF ADHESIVE MATERIALS CONTAINED IN SECONDARY FIBER WITH POLYVINYL ALCOHOL

[75] Inventor: Robert D. Moreland, Jacksonville, Fla.

[73] Assignee: Betz Laboratories, Inc., Trevose, Pa.

[*] Notice: The portion of the term of this patent subsequent to May 17, 2005 has been disclaimed.

[21] Appl. No.: 785,420

[22] Filed: Oct. 8, 1985

[51] Int. Cl.$^4$ ............................ D21C 5/02; D21C 9/08
[52] U.S. Cl. ..................................... 162/5; 162/168.1; 162/199; 162/DIG. 4
[58] Field of Search ....................... 162/4, 5, 10–14 12, 162/72, 168.1, 168.7, 199, 160, DIG. 4

[56] References Cited

U.S. PATENT DOCUMENTS

| | | | |
|---|---|---|---|
| Re. 29,960 | 4/1979 | Mazzarella et al. | 162/184 |
| 2,407,469 | 6/1946 | Tolund et al. | 162/168.1 |
| 3,764,460 | 10/1973 | Miyamoto et al. | 162/5 |
| 3,920,508 | 11/1975 | Yonemori | 162/157.5 |
| 3,920,509 | 11/1975 | Yonemori | 162/157.5 |
| 3,923,592 | 12/1975 | George et al. | 162/168.1 |
| 3,926,716 | 12/1975 | Bates | 162/168.1 |
| 3,992,249 | 11/1976 | Farley | 161/168.1 |
| 4,257,843 | 3/1981 | Watanabe et al. | 162/146 |
| 4,548,674 | 10/1985 | Hageman et al. | 162/5 |
| 4,608,123 | 8/1986 | Leahy | 162/199 |
| 4,744,865 | 5/1988 | Dreisbach et al. | 162/DIG. 4 |

FOREIGN PATENT DOCUMENTS 6096995  8/1981  Japan ............................. 162/168.1

OTHER PUBLICATIONS

Finch "Polyvinyl Alcohol–Properties and Applications", 1983.

*Primary Examiner*—Karen Hastings
*Attorney, Agent, or Firm*—Alexander D. Ricci; Gregory M. Hill

[57] ABSTRACT

The invention is directed to the use of polyvinyl alcohol to control the problem of "stickies" in waste paper processing.

22 Claims, No Drawings

DETACKIFICATION OF ADHESIVE MATERIALS CONTAINED IN SECONDARY FIBER WITH POLYVINYL ALCOHOL

The present invention is directed to a particular problem associated with the secondary fiber industry. The problem addressed by the present invention is found in all stages of this particular industry, including the repulping stage, the paper or paper product formation stage, paper or paper product finishing stage, and the handling, storage, and usage stages. The secondary fiber industry utilizes waste paper or paper products as a source of paper fiber (commonly) referred to as "secondary fiber") to produce finished paper products. Waste paper and paper products which are the source of the secondary fiber include any waste paper product such as newspapers, books, magazines, waste bags and boxes, waste ledgers, files, waste cuttings or trimmings from pressure sensitive adhesive backed labels, decals, stickers (i.e., bumper), etc. In producing the secondary fibers from these sources, a particular problem is encountered due to the adhesives, ink and coating binders (primarily those composed of synthetic polymers) that are found on some of the waste paper being utilized. More specifically labels, decals, stickers, stamps, envelopes, book bindings, etc., each have adhesives associated therewith and accordingly when waste products are recycled, the adhesives give rise to a contamination problem which is commonly referred to as "stickies". Stickies are the remainder of the adhesives, ink and coating binders (hot melt or pressure sensitive) and cause users of waste paper a range of problems relating to machine runnability through to finished product quality.

Since stickies generally have the same density as water and fiber, they are difficult to remove. The stickies may be pliable and therefore cannot be completely screened from the water and/or fiber mixture. Equipment currently being utilized is effective to a certain degree but not 100%.

The unremoved stickies cause problems to the manufacturing equipment, since they deposit on the forming fabrics, the felt, the rolls, machine wires, belts, presses, dryer surfaces, etc. The stickies also mark or hole the sheet.

If the stickies do not adhere to the machine parts they can be incorporated in the finished sheet, causing problems when the finished sheet is converted into whatever the finished product may be. Here again the stickies will deposit and adhere to rolls or create sheet breaks during the unwind or rewind operations since the stickies in the sheets (when rolled upon themselves) have a tendency to adhere the surfaces together.

Obviously production economies are affected quite severely when stickies-related problems are encountered. Stickies commonly necessitate complete shutdown of the manufacturing equipment in order to remove such by solvent washing techniques. The cleaning process is expensive due to downtime as well as solvent costs.

GENERAL DESCRIPTION OF THE INVENTION

The present inventor discovered that adhesion of pressure sensitive materials can be drastically reduced by treatment with dilute aqueous solutions of a particular polymeric material. Since it is the property of contact adhesion that causes stickies to be so troublesome, the subject polymeric material was recognized as a useful treatment for controlling the depositing tendency and the resulting interference with runnability. Subsequent field trials showed that a superior quality finished paper was produced that did not have stickies related problems when wound and unwound from rolls. Although the most desirable stage for addition of the polymeric material is at a location in which it will be in intimate contact with the stock for at least 30 minutes prior to the stock passing point at which the stickies deposit, the polymeric material may be added to the paper machine showering systems that wet and lubricate the felts and forming fabrics.

The invention is particularly effective in combatting stickies problems when the recycled waste paper or paper product contains pressure sensitive adhesives comprised of styrene butadiene rubber (SBR), vinyl acrylic based adhesives, natural rubber, polyisoprene, etc. It is also expected that the invention would also be applicable in combatting stickies problems which are due to hot melt adhesives which become pressure sensitive when temperatures during use are slightly below their melting points. Hot melt adhesives include polymeric materials such as polystyrene, polypropylene, polyethylene, ethylene vinyl acetate and the like.

DETAILED DESCRIPTION OF THE INVENTION

The invention calls for the use of a polymeric material comprised of polyvinyl alcohol moieties, which polymer also contains some hydrophobic groupings such as acetate, propionate, butyrate, oleate and the like, but should not contain so much of the hydrophobic groupings as to render the polymeric material water insoluble. The polyvinyl alcohol polymeric material (PVA) can have molecular weight ranges from about 2000 to 125,000 or greater, with the higher molecular weight polymers being somewhat better for detackification purposes.

The polymeric materials may be composed primarily of vinyl alcohol moieties or be copolymerized with other monomeric materials which do not inhibit and in amounts which do not affect the efficacy of the polymeric materials for the purpose. As earlier indicated, the polymer PVA must contain at least some hydrophobic groupings. Of specific utility is a polyvinyl alcohol which has been prepared by the polymerization of polyvinyl acetate which is subsequently hydrolyzed with caustic or by base catalyzed methanolysis to produce a polymer composed primarily of vinyl alcohol moieties but also containing acetate groupings. While some commercial PVA polymers are sold as being 100% hydrolyzed, in many instances they are not totally hydrolyzed but do contain a minimal number of acetate groupings.

The PVA's which have been found to be most suitable in accordance with the invention are those which have been 70-99% hydrolyzed, with 87-89% hydrolyzation being preferred. The degree of hydrolyzation as specified indicates that for example in the case of the hydrolyzation of polyvinyl acetate, the 30 to 1% of the acetate groups have not been hydrolyzed, thus remaining intact, and thereby providing the necessary hydrophobic functional groups.

For the best results, the polymeric PVA materials are added to the papermaking system at a location that will allow intimate contact between the treatment and the contaminated paper stock for a period of at least 30 minutes. The PVA concentration should be sufficient to allow for subsequent dilution so that a concentration of 3 ppm to 5 ppm is maintained on the paper machine or at the point where stickies deposit control is desired. Additionally, the polymeric materials may be added to the spray waters utilized during the paper sheet-making process. In this regard, during formation of the fibrous sheet on the wires and/or fabrics, and the rolling or pressing of the fibrous sheet, the sheet is being subjected to various sprays or showers. To insure against any problems due to stickies on felts or press rolls, it is desirable to add the polymeric materials of the invention to water showers or sprays that are used to clean and lubricate these parts.

EXPERIMENTAL

In order to establish the efficacy of the polymeric materials of the invention as detackification agents, a laboratory test was devised utilizing adhesive-backed tapes as stickie coupons.

The stickie coupon can be fabricated from any type of adhesive tape that will not disintegrate when placed in water. The most meaningful results are obtained when the stickie coupon is fabricated from a tape that is made with an adhesive that is causing quality or runnability problems in paper manufacture. For the study, tapes made from a styrenebutadiene rubber and vinylic esters were used. Both of these materials are known to cause problems (stickies) in secondary fiber utilization. A second coupon is fabricated from polyester film such as the product marketed as MYLAR by the DuPont Chemical Company. This material was chosen because papermachine forming fabrics are frequently made of polyester which is susceptible to considerable problems caused by stickies.

140 mL of solutions in 150 mL beakers containing various polyvinyl alcohols are placed in a water bath heated to 50° C. The stickie coupons and the polyester film coupons are placed in the test solution so the adhesive side of the coupon faces away from the polyester film coupon. After 1 hour of immersion, the adhesive side of the stickie coupon is placed in contact with the polyester coupon and pressed to 25 psi between rubber mats in a press with heated platens.

The average peel strength of the bond formed between the stickie tape coupon and the polyester coupon was measured with an Instron tensile tester. The peel strength of the bond formed between the stickie tape coupon and the polyester coupon was interpreted as a measure of the tendency for an adhesive stickie contaminant to attach to components of a papermachine and cause runnability or product quality problems.

The tables that follow illustrate the results obtained utilizing a polyvinyl alcohol having a molecular weight of approximately 120,000 and a degree of hydrolyzation of from about 87–89%.

TABLE 1A

Effect of Polyvinyl Alcohol on the Bond Strength of Styrene Butadiene and Adhesive Tape to Polyester Film.

| PVA V | PVA |
|---|---|
| 0   ppm | 5.55 ± 0.15  lbs. |
| 1.0 | 2.88 ± 0.13 |
| 3.0 | 0.48 ± 0.08 |
| 5.0 | 0.10 ± 0 |

Values in the table are the average of two measurements and the deviation from the average of each measurement.

Similarly, Table 1B illustrates the effect of the same polyvinyl alcohol on the adhesion of a tape that was analyzed and found to contain vinylic ester adhesives.

TABLE 1B

Effect Polyvinyl Alcohol on the Bonding Strength of an Adhesive Containing Vinylic Esters to the Polyester Film.

| PVA V | PVA |
|---|---|
| 0   ppm | 2.70 ± 0  lbs. |
| 1.0 | 1.30 ± 0.15 |
| 3.0 | 0.65 ± 0.10 |
| 5.0 | 0.23 ± 0.03 |

Additional studies were conducted to compare results obtainable with the polyvinyl alcohol as set forth in Tables 1A and 1B with other polyvinyl alcohols having different degrees of hydrolysis and different molecular weights.

The adhesive utilized in the study was styrene butadiene rubber (SBR). These coupons were also treated 60 minutes in 50° C. $H_2O$ bath and pressed for 60 seconds in 50° C. press at 25 psi. Peel strengths were measured on an Instron tester.

TABLE 2

| Treatment Concentration | Peel Strength | | | | |
|---|---|---|---|---|---|
| | PVA I | PVA II | PVA III | PVA IV | PVA V |
| 1 ppm | 3.15 | 3.70 | 3.65 | 3.45 | 3.20 |
| 1 ppm | 2.50 | 3.90 | 3.45 | 4.15 | 2.95 |
| 3 ppm | 2.40 | 3.55 | 1.75 | 1.45 | 0.50 |
| 3 ppm | 2.10 | 2.40 | 2.05 | 1.00 | 1.05 |
| 5 ppm | 1.60 | 2.05 | 0.75 | 0.60 | 0.40 |
| 5 ppm | 1.25 | 1.70 | 1.20 | 0.30 | 0.20 |

Control: No Treatment: Peel Strength 5.3
Control: No Treatment: Peel Strength 5.15
PVA I - MW 3,000: 77% Hydrolyzed
PVA II - MW 10,000: 85–87% Hydrolyzed
PVA III - MW 2,000: 72.9% Hydrolyzed
PVA IV - MW 96,000: 85–87% Hydrolyzed
PVA V - MW 120,000: 87–89% Hydrolyzed Additional studies utilizing SBR as the adhesive were conducted in accordance with the procedure earlier outlined but with relatively low feedrates. The results are recorded in Table 3.

TABLE 3

| Treatment | Dosage (ppm) | Peel Strength |
|---|---|---|
| Control | — | 4.65 |
| Control | — | 4.95 |
| PV III | 0.5 | 3.95 |
| PVA III | 0.5 | 4.55 |
| PVA III | 1.0 | 3.35 |
| PVA III | 1.0 | 3.70 |
| PVA II | 0.5 | 3.85 |
| PVA II | 0.5 | 4.55 |
| PVA II | 1.0 | 3.15 |
| PVA II | 1.0 | 3.2 |
| PVA I | 0.5 | 4.1 |
| PVA I | 0.5 | 3.95 |
| PVA I | 1.0 | 3.45 |
| PVA I | 1.0 | 3.25 |
| PVA IV | 0.5 | 3.85 |
| PVA IV | 0.5 | 3.90 |
| PVA IV | 1.0 | 3.35 |
| PVA IV | 1.0 | 3.10 |

To confirm the performance of PVA IV and PVA V, additional tests were conducted utilizing the aforementioned procedure and SBR as the adhesive.

TABLE 4

| Treatment | Dosage (ppm) | Peel Strenth |
|---|---|---|
| Control | — | 5.4 |

TABLE 4-continued

| Treatment | Dosage (ppm) | Peel Strenth |
|---|---|---|
| Control | — | 5.7 |
| PVA IV | 1.0 | 2.65 |
| PVA IV | 1.0 | 3.0 |
| PVA IV | 3.0 | 0.40 |
| PVA IV | 3.0 | 0.70 |
| PVA IV | 5.0 | 0.10 |
| PVA IV | 5.0 | 0.10 |
| PVA V | | 2.75 |
| PVA V | | 3.00 |
| PVA V | | 0.55 |
| PVA V | | 0.40 |
| PVA V | | 0.10 |
| PVA V | | 0.10 |

Both PVA IV and PVA V appeared to be quite effective.

FIELD TRIAL

Because of the efficacy of the invention a field trial was conducted. The specifics are as follows:

Mill A was producing 50,000 ton/year of which about 26,000 tons was backing paper for release label which had problems with stickies. The furnish for the release grade consisted of 85 to 90% virgin fiber and 10 to 15% pulp substitute. The pulp was primarily recycled white paper plate cuttings. The stickies were associated with a particular source of pulp substitute.

Stickies were not a major problem on the machine but manifested themselves in three ways:

(1) The stickies prevented uniform silicone coating. When the label was peeled away portions would adhere to the uncoated stickie.

(2) Stickies particles would pick off on the coater applicator roll causing spots in the coating surface.

(3) When stickies were present they "set up" in the reel overnight. When the reel was rewound the next day holes occurred due to the sheets sticking together.

Mill A had received a large shipment of pulp substitute that contained stickies and had caused problems in the past. The objective of the trial was to enable the mill to utilize the contaminated pulp substitute for release paper. At the start of the trial the virgin stock system was treated batchwise with 3 ppm of PVA V. During this buildup, good pulp substitute (known to be stickie free) was being used. When the target concentration was established, the contaminated pulp substitute was treated with 30 ppm of PVA V in the hydropulper. Subsequent dilution of the pulp brought the concentration down to about 3 ppm.

A total of four hydropulper runs were treated, enough for eight finished reels.

An unusual amount of dirt in the sheet was noticed during the day. This improved after the broke dump chest was purged but seemed to reappear near the end of the trial. Analysis of the pulp contaminants by mass spectroscopy found acetate and phthalate residuals.

These species are known to be components of synthetic polymers that are used for coating binders and adhesives.

Two rolls of treated paper were rewound and no holes or other defects were observed.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. A method of inhibiting the deposition and adherency of hot melt and/or pressure sensitive adhesive materials on the surfaces of repulping equipment during the repulping of waste paper and paper products containing such which consists essentially of repulping said waste paper or paper products in the presence of a sufficient amount for the purpose and in the range of about 0.5 to about 30 ppm of a polymer consisting essentially of moieties of vinyl alcohol, which polymer contains at least some hydrophobic groupings and is water-soluble.

2. A method according to claim 1 wherein the vinyl alcohol polymer is derived from polyvinyl acetate which has been 70-99% hydrolyzed.

3. A method according to claim 2 wherein the degree of hydrolyzation is 87-89%.

4. A method according to claim 3 wherein the molecular weight of the polymer is from about 2,000 to 125,000.

5. A method according to claim 4 wherein a sufficient amount of the vinyl alcohol polymer is added to assure that at least 5 ppm of polymer is present for stickies deposit control.

6. A method according to claim 1 wherein the adhesive material is selected from the group consisting of styrene butadiene rubber, vinyl acrylate based adhesives, natural rubber adhesives, and polyisoprene adhesives.

7. A method according to claim 6 wherein the vinyl alcohol polymer is derived from polyvinyl acetate which has been 70-99% hydrolyzed.

8. A method according to claim 7 wherein the degree of hydrolyzation is 87-89%.

9. A method according to claim 8 wherein the molecular weight of the vinyl alcohol polymer is from about 2,000 to 125,000.

10. A method according to claim 9 wherein a sufficient amount of the vinyl alcohol polymer is added to assure that at least 5 ppm of polymer is present for stickies deposit control.

11. A method of inhibiting the deposition and adherency of hot melt and/or pressure sensitive adhesive materials contained in pulp produced from waste paper or paper products on the surfaces of equipment, utilized to produce finished paper products from said pulp which consists essentially of adding to the pulp a sufficient amount for the purpose and in the range of about 0.5 to about 30 ppm of a polymer consisting essentially of moieties of vinyl alcohol, which polymer contains at least some hydrophobic groupings and is water-soluble.

12. A method according to claim 11 wherein the adhesive material is selected from the group consisting of styrene butadiene rubber, vinyl acrylate based adhesives, natural rubber adhesives, and polyisoprene adhesives.

13. A method according to claim 12 wherein the vinyl alcohol polymer is derived from polyvinyl acetate which has been 70-99% hydrolyzed.

14. A method according to claim 13 wherein the degree of hydrolyzation is 87-89%.

15. A method according to claim 14 wherein the polyvinyl alcohol polymer has a molecular weight of from about 2,000 to 125,000.

16. A method according to claim 15 wherein a sufficient amount of the vinyl alcohol polymer is used to assure that at least 5 ppm of polymer is present for stickies deposit control.

17. A method of assuring that paper and paper products do not adhere to the surfaces of production equipment or to any other surfaces including its own surface which products are produced from pulp derived from waste paper or paperboard containing hot melt and/or pressure sensitive adhesive materials, which consists essentially of incorporating in said paper or papr product a sufficient amount for the purpose and in the range of about 0.5 to about 30 ppm of a polymer consisting essentially of moieties of vinyl alcohol, which polymer contains some hydrophobic groupings and is water-soluble.

18. A method according to claim 17 wherein the vinyl alcohol polymer is derived from polyvinyl acetate which has been 70–99% hydrolyzed.

19. A method according to claim 18 wherein the degree of hydrolyzation is 87–89%.

20. A method according to claim 19 wherein the polymer has a molecular weight of from about 2,000 to 125,000.

21. A method according to claim 20 wherein a sufficient amount of polymer is added to assure that a minimum of 5 ppm of polymer is present for stickies deposit control.

22. A method according to claim 21 wherein the adhesive material is selected from the group consisting of styrene butadiene rubber, vinyl acrylate based adhesives, natural rubber adhesives, and polyisoprene adhesives.

* * * * *